(12) United States Patent
Thorpe

(10) Patent No.: US 7,501,142 B2
(45) Date of Patent: Mar. 10, 2009

(54) BATTER COATING FOR FOOD PIECES

(75) Inventor: Alan Thorpe, St. Eleanor's (CA)

(73) Assignee: Cavendish Farms Corporation, New Brunswick (CA)

( * ) Notice: Subject to any disclaimer, the term of this patent is extended or adjusted under 35 U.S.C. 154(b) by 713 days.

(21) Appl. No.: 11/227,394

(22) Filed: Sep. 15, 2005

(65) Prior Publication Data

US 2006/0013935 A1 Jan. 19, 2006

Related U.S. Application Data

(63) Continuation-in-part of application No. 10/209,057, filed on Jul. 31, 2002, now Pat. No. 6,953,597.

(51) Int. Cl.
*A21D 10/04* (2006.01)
(52) U.S. Cl. .................. 426/550; 426/552; 426/555
(58) Field of Classification Search ................ 426/102, 426/549, 550, 552, 555, 637
See application file for complete search history.

(56) References Cited

U.S. PATENT DOCUMENTS

| | | | |
|---|---|---|---|
| 3,597,227 A | 8/1971 | Murray et al. | |
| 4,188,410 A | 2/1980 | Rispoli et al. | |
| 4,375,484 A | 3/1983 | Lee et al. | |
| 4,990,343 A | 2/1991 | Haarasilta et al. | |
| 5,059,435 A | 10/1991 | Sloan et al. | |
| 5,141,759 A | 8/1992 | Sloan et al. | |
| 5,302,410 A | 4/1994 | Calder et al. | |
| 5,431,944 A | 7/1995 | Melvej | |
| 5,622,741 A | 4/1997 | Stubbs et al. | |
| 5,707,670 A | 1/1998 | Mebansho et al. | |
| 5,753,286 A | 5/1998 | Higgins | |
| 5,855,945 A | 1/1999 | Laughlin et al. | |
| 5,885,617 A | 3/1999 | Jordan | |
| 5,885,639 A | 3/1999 | Judkins et al. | |
| 6,093,426 A | 7/2000 | Tai et al. | |
| 6,132,785 A | 10/2000 | Collinge et al. | |
| 6,335,041 B1 | 1/2002 | Baur et al. | |

*Primary Examiner*—Arthur L Corbin
(74) *Attorney, Agent, or Firm*—Heslin Rothenberg Farley & Mesiti P.C.

(57) ABSTRACT

A batter slurry, for coating food pieces so as to enhance crispness hold time for extended periods in take-out food conditions, comprising, as a percentage of a dry batter used to make the slurry, 97.4 to 99.8% by weight of a batter base selected from a modified food starch batter base and a flour batter base. The batter base comprises a modified food starch of from 10 to 60% by weight of the batter. The modified food starch is acetylated, cross-linked or acetylated and cross-linked. The dry batter further comprises from 0.0 to 1.0% by weight of calcium lactate and from 0.1 to 1.6% by weight of de-oiled lecithin. Coated food pieces are par-fried and preferably frozen. The frozen pieces, once reconstituted, retain their crispness under adverse, e.g. high humidity, conditions such as those encountered under take-out conditions where such pieces are typically placed into a closed container for home delivery or take out.

16 Claims, No Drawings

BATTER COATING FOR FOOD PIECES

CROSS REFERENCE TO RELATED APPLICATIONS

This is a continuation-in-part application of patent application Ser. No. 10/209,057 filed on Jul. 31, 2002, now U.S. Pat. No. 6,953,597, the disclosure of which is incorporated herein by reference.

FIELD OF THE INVENTION

This invention relates to: a batter coating; the preparation of food pieces using the batter coating, such as pieces of meat, poultry (e.g. chicken), fish, vegetables (e.g. potatoes, sweet potatoes, mushrooms, onion rings, zucchini) and dairy (e.g. cheese) products; and such and other food pieces coated with the batter coating. The food pieces so prepared have extended crispness holding qualities in high humidity and high temperature situations such as those encountered in restaurant take-out applications, e.g. where food pieces are portioned in closed boxes to be taken home prior to serving and consumption.

A batter coating containing a modified and cross linked starch in combination with lecithin, and other non essential ingredients, has been found by the applicants to provide extremely long hold times once reconstituted, and to have the additional benefit of enabling the reconstituted product, once the product has cooled, to be micro-waved to yield a hot and crispy food product. The initial application of this batter was to potato pieces (per applicants' patent application Ser. No. 10/209,057). Further experimental work was performed to determine if such a coating would impart similar characteristics to other foods. For the purpose of this experimentation, cheddar cheese, mushrooms (portobello and button types), onion rings and chicken were used as food products. Unlike potato products, these products in the prior art tend to be coated with very heavy coatings of either a batter or batter and breading. In many instances, the batter and breading make up 30% of the total finished product weight. As discussed further herein, these experiments on other food products showed that such a coating imparts similar characteristics to those noted with the initial experiments on potato pieces, e.g. French fry strips.

BACKGROUND OF THE INVENTION

Retention of crispness of French fries and other foods is of great concern for take-out food operations which package the food pieces, such as French fry strips, after finish frying, into various types of packages for transport to consumers' homes. While being transported home, such foods are subjected to conditions of high heat and humidity in the packages. The result is re-hydration of the batter on the surface of each food piece and, consequently for example, an undesirably limp, soggy and tough French fry. Various procedures have been proposed for extending the crispness-holding quality of French fries after finish frying.

U.S. Pat. No. 5,885,639 relates to a procedure for extending the crispness-holding time of French fries through application of a pre-coating containing a hydrocolloid prior to coating the strips with a batter.

U.S. Pat. No. 5,141,759 relates to a procedure whereby potato strips with increased crispness are obtained by coating the strips prior to par-frying with an aqueous slurry containing chemically modified, ungelatinized potato starch, chemically modified, ungelatinized corn starch, and rice flour.

U.S. Pat. No. 3,597,227 relates to coating potato strips, prior to deep frying, with a coating of high amylose starch for the purpose of increasing the crispness of the strips.

U.S. Pat. No. 5,302,410 discloses application of a glaze coating of hydrolysed starch with a DE of less than 12 at pH levels of 5.5-8.5, to increase the crispness of French fry strips.

U.S. Pat. No. 5,431,944 relates to use of a batter mix containing a leavening agent, a blend of starch and high amylose starch, dextrin and a food gum to increase crispness.

U.S. Pat. No. 5,622,741 discloses that strips coated with a slurry of corn flour, corn starch and low solubility dextrin prior to par-frying yields a product which, upon re-frying, exhibits increased crispness.

These prior procedures have met with qualified success in the food processing industry. All of these procedures appear to address the need for a French fry with improved crispness over an extended period of time. However, they all only address the need for enhanced or extended crispness under conditions found in fast-food and eat-in restaurants, e.g. where French fries or other food products are either served immediately upon reconstitution, or held under sophisticated holding stations and/or operating procedures until served. None of the patents address the loss of crispness of food products, either coated or uncoated, when they are subjected to the high heat and humidity conditions imposed by take-out restaurant operations. There is, therefore, a need for a means to extend the duration of crispness of take-out food products under take-out food conditions.

SUMMARY OF THE INVENTION

The invention provides a novel batter coating for food pieces, preferably of meat, poultry, fish, vegetable or dairy products, prior to par-frying of the food pieces. The batter coating is a slurry comprising a dry batter mixed in water, i.e. a "batter slurry" herein. The dry batter comprises from 97.4% to 99.8% by weight of a modified food starch batter base or flour batter base, wherein the batter base comprises a modified food starch of from 10 to 60%, preferably from 30 to 50% by weight of the dry batter, from 0.1 to 0.7% by weight of de-oiled lecithin and from 0.0 to 1.0% by weight of calcium lactate, preferably from 0.1 to 1.0% of calcium lactate. The modified food starch is acetylated, cross-linked, or acetylated and cross-linked. A "modified food starch batter base" herein is a batter base in which there is more modified food starch than any other constituent. A "flour batter base" herein is a batter base in which there is more flour than any other constituent. Preferably, the flour is a wheat flour. The term "food pieces" used herein and throughout this application includes food pieces of various shapes and sizes, and the pieces may be cut or shaped.

In another aspect the invention also provides a process for producing either non-frozen refrigerated, or frozen, par-fried food pieces, which, when heated for consumption, have extended crispness in relatively high humidity food storage environments. The process comprises applying the foregoing described batter slurry of the present invention to food pieces for par-frying to produce battered food pieces, then par-frying the battered food pieces to produce par-fried food pieces, and then freezing, or refrigerating without freezing, the par-fried food pieces.

In a further aspect the invention provides for par-fried food pieces, frozen or unfrozen, which are coated with the foregoing described batter slurry of the present invention.

The par-fried food pieces, e.g. potato pieces, of the present invention, upon reconstitution, retain a crisp, tender surface texture and mealy interior for extended periods of time in take-out containers. The extended holding ability of this product, i.e. excellent crispness and resistance to re-hydration, is believed to be due to the unique, synergistic combination of the modified food starch and de-oiled lecithin ingredients within the batter formulation which is the subject of the invention.

The batter slurry described herein may be applied at varying thickness to any food piece, e.g. any cut of French fry, depending upon the desired degree of crispness retention and surface smoothness desired. Thicker batters, i.e. having higher solids content, will retard crispness loss to a higher degree and, therefore, would be preferable for use in more challenging conditions.

It has been found that food pieces, such as potato pieces, prepared in accordance with the present invention can retain their crispness for periods in excess of 10 minutes when sealed in impervious containers immediately after finish frying. This performance far outperforms any commercially available existing product, or product described by the patents discussed herein above.

DETAILED DESCRIPTION

The following description relates to specific products, applications and methods in accordance with the present invention and, as such, are exemplary and not limiting of the scope of the invention. The description initially is mostly about potato products, but later herein covers other food products.

Raw, whole potatoes are typically washed and sorted to remove defective units and, optionally, peeled. Skin-on products are prepared by by-passing the peeling step. The whole potatoes may optionally be pre-heated for 20-45 minutes at a temperature in the range of about 120° to 150° F. to aid in cutting the potatoes into strips. The potatoes are cut into the desired shape, e.g. strips, and preferably blanched in hot water to inactivate enzymes, gelatinize the starch in the potato flesh, and leach sugars from the potato pieces. Typically, blanching involves holding the strips under agitated water at a temperature in the range of about 160°-190° F. for a period in the range of about 5-30 minutes.

After blanching, the potato pieces may be optionally dipped into a food preparation solution containing one or more of sodium acid pyrophosphate, dextrose, salt, or colour, as desired. After the dipping step, the strips may be dried, losing about from 8% to 20% of their weight. The drying process aids, but is not essential to obtaining, the extension of holding time and crispness available under the present invention. This is in contrast to known preparations of French fries, where drying is essential to maintenance of the crispness of the fry. If strips are dried under the process of the present invention, they are preferentially dried using hot air in a conventional dryer designed for this purpose. Temperatures of from about 90° to 150° F. and times from about 8 to 28 minutes are typically used.

Subsequent to optional drying, the potato pieces are coated with the batter slurry, made from the dry batter, which batters respectively are the subject of this invention. The desired crispness and holding properties are conveyed to the potato product by a unique combination of modified food starch and de-oiled lecithin used in the batter formulations. Preferably, calcium lactate is added to the batter concerned to control or improve colour resulting from the foregoing combination. A batter in accordance with the present invention is any modified food starch based, or flour based, batter for coating potato pieces for par frying, which includes the essential ingredients of modified food starch and de-oiled lecithin, and optionally the calcium lactate. In either a modified food starch based or flour based dry batter, there is modified food starch in the range of from 10 to 60% of the dry batter, preferably 30 to 50% of the dry batter. The former range is the broadest which appears to work in the subject invention. However, if modified food starch content is between 10 to 30% or between 50 to 60% of the dry batter, the batter slurry exhibits properties of the present invention but not to the degree that is obtained within the preferred range of 30 to 50% of the dry batter. If modified food starch content is below 10% of the dry batter, the batter slurry formed from the dry batter does not perform any better than conventional batters. If modified food starch content is above 60% of the dry batter, end product is undesirably tough and chewy.

One example of a batter, in accordance with the present invention, has the following formulation (expressed in percent-by-weight of the dry batter):

| | |
|---|---|
| Modified Food Starch: | 40-60% |
| Rice flour: | 10-45% |
| Dextrin: | 5-30% |
| Salt: | 0-10% |
| Deoiled lecithin: | 0.1-1.6%, preferably 0.2-1.6% |
| Calcium lactate: | 0.0-1.0%, preferably 0.1-1.0%, most preferably 0.2-1.0% |
| Leavening: | 0-5% |
| Xanthan gum: | 0-0.5% |

The modified food starch may be any modified food starch which is acetylated, cross-linked, or acetylated and cross-linked, although acetylated and cross-linked modified food starches are preferred as they appear to produce a product with the highest degree of crispness and holding enhancement. Most preferred are modified potato starches which are acetylated and cross-linked. Modified food starches which are neither acetylated nor cross-linked are not covered by the present invention.

Any de-oiled lecithin, such as Lecigran™ 5750 from Riceland, may be used in the inventive formulation. The de-oiled lecithin and modified food starch within the inventive formulation work synergistically to provide a short, crisp texture which resists rehydration, while the optional, but preferred calcium lactate acts as a texturizing agent and inhibits darkening of the finished product which would normally accompany the use of the de-oiled lecithin. Where a dark finished product is desired, the calcium lactate may be removed from the formulation, or dextrose added to obtain the desired colour.

The batter slurry coated product obtained through use of the batter formulations of the present invention has a very tender and short crispness, unlike conventional flour or starch based batter coated products which exhibit a harder, more glassy crispness. Flavoured products with the same unique holding ability and crispness properties may be obtained through adding flavour or spice, of up to 10% by weight of the dry batter, to the formulations of the present invention. Texture and appearance adjustments to the formulations of the present invention may be made by adjusting the types and amounts of non-essential ingredients, the essential ingredients being the modified food starch and de-oiled lecithin. The calcium lactate is a much preferred, though not essential, ingredient.

The batter slurries of the present invention may be applied by spraying the batter slurry onto the potato pieces, dipping the potato pieces into the batter slurry, or by allowing the potato pieces to travel on a conveyor through a batter slurry cascade.

Subsequent to application of the batter slurry, the product may be passed under air blowers to remove excess batter, adjust the batter pickup, or affect the crispness or appearance of the product.

The batters of the present invention are applied when in the form of a slurry in water, i.e as a batter slurry. Preferably, when applied to dried French fry strips, such slurry has solids levels in the range of about 20-60% by weight of the slurry, more preferably 30-50% by weight of the slurry, and viscosities in the range of about 200-2000 centipoise, more preferably 300-1800 centipoise, as measured by a Brookfield DVII viscometer utilizing a number 4 spindle and a speed of 20 rpm, depending upon the thickness of the batter desired on the end product.

EXAMPLE 1

A series of tests were performed on potato product coated with examples of batter slurries made in accordance with the present invention, utilizing a modified food starch batter base or a wheat flour batter base. The two examples of the inventive formulations tested were as follows (in % by weight of the dry batter):

| (1) Food Starch Based Dry Batter: | | (2) Wheat Flour Based Dry Batter: | |
|---|---|---|---|
| Modified Potato Starch: | 47.60% | Wheat flour: | 36% |
| Rice flour: | 25.0% | Modified Potato Starch: | 15% |
| Dextrin: | 15.0% | Rice flour: | 22% |
| Salt: | 7.90% | Dextrin: | 15% |
| De-oiled lecithin: | 0.40% | Salt: | 10% |
| Calcium lactate: | 0.60% | De-oiled lecithin: | 0.4% |
| Leavening: | 3.30% | Calcium lactate: | 0.6% |
| Xanthan gum: | 0.20% | Leavening: | 0.8% |
| | | Xanthan gum: | 0.2% |
| | | Dextrose: | 0.0% |

French fry strips cut at 7/16 inch raw dimensions were processed using the above-noted examples of inventive, as well as comparative non-inventive, modified food starch based and flour based batters as clear coat slurry formulations. Both of the non-inventive formulations had the same formulas as the inventive formulations, except that the former used different starches (the modified food starch based batter used cross-linked KVJ modified food starch of Emsland—Starke GmbH, and the wheat flour based batter used an acetylated starch), did not use de-oiled lecithin and did not use calcium lactate. Both of the non-inventive formulations represented currently available commercial products that are used in some take-out operations. These non-inventive products were compared to batter covered strips prepared using the inventive formulations for achieving increased crispness hold time. Each sample was fried for 3 minutes in a Frymaster™ 40 pound gas fryer. After frying, the fry strips were immediately placed into plastic bags. The product was sealed in the plastic bags and held for 10, 20, 30, 40 and 50 minutes. For this test, the crispness of the batter of the present invention was given a rating of 10 and, a total lack of crispness was given a rating of 0. The results of this test are shown below in Table I.

French fry strips cut at 7/16 inch raw dimensions were processed using the above-noted examples of inventive, as well as comparative non-inventive, modified food starch based and flour based batters as clear coat slurry formulations. Both of the non-inventive formulations had the same formulas as the inventive formulations, except that the former used different starches (the modified food starch based batter used cross-linked KV™ modified food starch of Emsland—Starke GmbH, and the wheat flour based batter used an acetylated starch), did not use de-oiled lecithin and did not use calcium lactate. Both of the non-inventive formulations represented currently available commercial products that are used in some take-out operations. These non-inventive products were compared to batter covered strips prepared using the inventive formulations for achieving increased crispness hold time. Each sample was fried for 3 minutes in a Frymaster™ 40 pound gas fryer. After frying, the fry strips were immediately placed into plastic bags. The product was sealed in the plastic bags and held for 10, 20, 30, 40 and 50 minutes. For this test, the crispness of the batter of the present invention was given a rating of 10 and, a total lack of crispness was given a rating of 0. The results of this test are shown below in Table I:

TABLE I

| Hold Time | Inventive Take-Out Batter Coated Product Rating | Non-inventive Flour Based Clear Coated Product Rating | Non-inventive Starch Based Clear Coated Product Rating |
|---|---|---|---|
| 10 Minutes | 10 | 5 | 8 |
| 20 Minutes | 9.5 | 2 | 7 |
| 30 Minutes | 8.5 | 0 | 4 |
| 40 Minutes | 8 | 0 | 3 |
| 50 Minutes | 7.5 | 0 | 3 |

This test showed a clear preference for the product coated with the inventive batter slurry containing the de-oiled lecithin and modified potato starch. The non-inventive starch based batter slurry and flour based batter slurry used in this study each had the same formula as the inventive take-out batter slurry, but omitted the lecithin and calcium lactate and utilized a different type of modified potato starch.

EXAMPLE 2

In order to determine which ingredients were providing the benefits of increased crispness and of resistance to re-hydration, an additional series of tests was performed. In this series of tests, the methods used in Example 1 were repeated on 0.305" raw cut pieces of potato, but a control, made according to the invention, was evaluated against:

a) the control formula without the lecithin, b) the control formula without the calcium lactate, c) the control formula without calcium lactate and lecithin, and d) the control formula with a different type of modified potato starch, namely KV™ Modified Starch (Emsland—Starke GmbH), which is a chemically modified food starch that is cross-linked, but not acetylated.

The results of this series of tests are shown in Table II, below:

TABLE II

| Time | Control | No Lecithin | No Calcium Lactate | No Lecithin and Calcium Lactate | KV Modified Starch |
|---|---|---|---|---|---|
| 10 Minutes | 10 | 10 | 10 | 8 | 9 |
| 20 Minutes | 9.5 | 7 | 9 | 7.5 | 7 |
| 30 Minutes | 8.5 | 6 | 8 | 6.5 | 7 |
| 40 Minutes | 8 | 6 | 8 | 6.5 | 7 |
| 50 Minutes | 7.5 | 6 | 7 | 5 | 5 |
| 60 Minutes | 7 | 4.5 | 6.5 | 4.5 | 4.5 |

These tests show that the major component contributing to the extended hold time is the lecithin. The trial where both the calcium lactate and lecithin were removed indicates that the calcium lactate has little to do with the extended hold time. The last trial, where the acetylated and cross-linked potato starch was substituted with a KV Modified Potato Starch, shows that there is a synergistic effect between the starch and the de-oiled lecithin, and it is this synergistic effect that results in the increase hold time in adverse conditions.

EXAMPLE 3

In order to simulate actual home delivery, Example 1 was largely repeated. The same kinds of products were cooked, but then were held for 5 minutes under a heat lamp before being portioned into paperboard boxes, which were placed into paper bags and allowed to sit for a period of 10 minutes at room temperature. At the end of the 10 minute hold, the products were evaluated. The results of the evaluation are shown below in Table III. The batter containing the lecithin and acetylated and cross linked starch is listed in Table III as "Special Formulation."

TABLE III

| Formulation | Crispness Immediately After Frying | Crispness After 10 Minutes Hold in Closed Boxes | Comments |
|---|---|---|---|
| Starch Based Clear Coat Slurry | 10 | 8 | Fair crispness, but chewy |
| Wheat Flour Based Clear Coat Slurry | 10 | 6 | Some crispness left, but product is chewy |
| Special Formulation | 10 | 9 | Very crisp exterior texture, no chewiness |

As shown in these tests, batter slurries containing de-oiled lecithin in combination with an acetylated and cross-linked starch best enhanced the holding ability of battered fries when the fries were held at conditions of high humidity and temperature such as are found in take out operations.

With respect to the invention as it relates to other food products, the following described experiments were conducted:

EXAMPLE 4

Mushrooms

Raw Portobello and button mushroom samples were coated with the batter formulation in question at a viscosity of 2700-2900 centipoises (measured using a Brookfield DVII viscometer, at 20 rpm and using spindle # 4).

Both samples exhibited good coverage after being coated and fried. There was no indication of a lack of adhesion of the batter to the substrate. Once battered and fried, the mushrooms were frozen and subjected to a reconstitution frying step in hot oil at 360° F. for a period of 2 minutes and 30 seconds. Initial results were not promising. The batter flaked off of the button mushrooms in the refry step. While the Portobello mushrooms retained the batter, and had a crisp outer coating which persisted for a period in excess of 30 minutes, the interior texture of the mushrooms was very wet and runny. The initial results indicated that, due to the extreme shrinking experienced by the mushrooms during the reconstitution phase, a modification to the pre-coating processing was needed.

This experiment was, thus, repeated using exactly the same batter formulation, but with the added step of blanching the mushrooms in live steam at 212° F. for a period of 2 minutes, followed by hot air drying (160° F.; 15 minutes) to achieve a dry loss of 16% on the button mushrooms and 22% on the Portobello mushrooms. After drying the mushrooms, they were coated with the batter formulation at a viscosity of 2750 centipoises, and excess batter was removed from the pieces through use of a low velocity air sweep, such that the pickup was 26% wet and 18% dry. The battered mushrooms were then coated with Krusto Breading 2037. These mushrooms so treated were then fried at 360° F. for a period of 45 seconds in a continuous fryer, and frozen. The frozen mushrooms were then reconstituted by frying them at 360° F. for 2 minutes and 30 seconds in a Frymaster™ fryer. As a control, some mushrooms were coated with a commercial batter breading system. Krusto Batter 999 (1 part dry batter to 1.4 parts water) and Krusto Breading 2037 were used to coat the control.

The sensory scores obtained on these samples over a period of time are shown in Table IV:

TABLE IV

| Material | Holding Time (Minutes) | Sensory Score |
|---|---|---|
| Control Button Mushrooms | 5 | 10 |
| | 10 | 5 |
| | 15 | 5 |
| | 20 | 4 |
| | 30 | 4 |
| Test button Mushrooms | 5 | 10 |
| | 10 | 8 |
| | 15 | 8 |
| | 20 | 7 |
| | 30 | 7 |
| Control Portabello mushrooms | 5 | 10 |
| | 10 | 7 |
| | 15 | 6 |
| | 20 | 6 |
| | 30 | 5 |
| Test Portabello Mushrooms | 5 | 10 |
| | 10 | 9 |
| | 15 | 8 |
| | 20 | 8 |
| | 30 | 7 |

The results of this experiment clearly showed that the coated mushrooms, which had been pre-processed to remove a portion of excess moisture, had a crisp coating once reconstituted by frying, and that the crispness of the coating persisted for a period in excess of 30 minutes. The control, which represented typical (prior art) battered and breaded mushrooms, did not retain its crispness as long as the product which was battered with the formulation containing an acetylated and cross linked starch in combination with lecithin prior to being breaded.

EXAMPLE 5

Animal Protein Products

It is well established that coating of proteinaceous materials such as chicken or fish poses unique challenges. Such products are generally, in the prior art, coated with an adhesion batter, which may initially be applied as a pre-dust or in a liquid form. This step may be followed by several more coatings of pre-dust and batter in order to build up the thickness of the coating layer. The final step in the coating process is generally the application of crumbs, which may be cracker crumbs, e.g. Japanese Bread Crumbs, or a number of other crumb types of various granulation sizes. The intention is to provide a product which retains its crispness upon cooking.

For Test 1, pre-cooked strips of chicken, which were cut into pieces ¾ in. wide by ⅜ in. thick, were coated with a commercial pre-dust (Griffith 2145 Predust), a batter (Griffith Krusto Batter 4700 at 1:1.6 solids to water), and the product was subsequently coated with Krusto Breading 7266 and fried in a continuous fryer for 90 seconds at 390° F. The product was then frozen in a blast freezer to −40° F. The product was then fried at 360° F. for a period of 3 minutes 30 seconds, and held under heat lamps for texture evaluation at set intervals. In Test I the application of the applicants' inventive batter coating was evaluated against the control product produced by using the same coating system described, but adding the additional step of a pass through the inventive coating after the crumb application. This batter was applied at a viscosity of 2010 centipoises (Spindle 4; 20 rpm on a Brookfield DVII).

In Test 2, the applicants' inventive batter was evaluated in a three pass system where the control made three passes through a pre-dust and batter system (as previously described) prior to being breaded. The inventive batter formulation was substituted for the final batter coating prior to the crumb application. All products were fried after breading in a continuous fryer operating at 390° F. for a period of 90 seconds, and were then frozen.

Evaluation of Example 5, Test 1:

TABLE V

| Product | Hold Time | Sensory Score |
|---|---|---|
| Control | 5 Minutes | 10 |
| | 10 Minutes | 10 |
| | 15 Minutes | 8 |
| | 20 Minutes | 6 |
| | 30 Minutes | 6 |
| Enhanced Crispness batter | 5 Minutes | 10 |
| | 10 Minutes | 10 |
| | 15 Minutes | 10 |
| | 20 Minutes | 8 |
| | 30 Minutes | 8 |

From the results in Table V, it is clear that the crispness of the product was enhanced, and the crispness was retained for a much longer time period than the control product.

Table VI details the results of Test 2, namely the trial where the inventive batter formulation, utilizing acetylated and cross linked starch and lecithin, was substituted for the final batter coating of the application steps prior to crumb application.

TABLE VI results from Test 2

| Product | Hold Time | Sensory Score |
|---|---|---|
| Control | 5 Minutes | 10 |
| | 10 Minutes | 10 |
| | 15 Minutes | 8 |
| | 20 Minutes | 6 |
| | 30 Minutes | 6 |
| Enhanced Crispness batter | 5 Minutes | 10 |
| | 10 Minutes | 10 |
| | 15 Minutes | 9 |
| | 20 Minutes | 9 |
| | 30 Minutes | 8 |

The results of this trial showed that there was a definite increase in holding time resulting from the substitution of the inventive batter containing acetylated and cross linked starch in combination with lecithin over the control sample.

One additional trial was conducted. The inventive batter for providing extended hold time was used as a final batter coating once the batter and breading had been applied to the pieces of chicken in the multi pass system. The application of the batter in this manner resulted in product with the highest degree of crispness when held for extended time. Even after several hours under a heat lamp, the product coated with the cross linked and acetylated starch/lecithin batter still retained most of its original crispness while the control coated with a traditional (prior art) coating and breading had lost most of its crispness. For the control, only the bread crumbs had retained crispness whereas for the extended hold time product, both the batter and crumbs retained crispness.

EXAMPLE 6

Cheese

Cheese cubes present a unique challenge in that, unlike other products which may be battered and breaded, the substrate melts during the reconstitution phase and can blow out of the coated piece due to expansion of the liquid. For this product a control was set up where ¾ in. Cheddar cheese cubes were dipped into a wheat flour batter containing 50% wheat flour and 50% water. The coated strips were then dusted with wheat flour and the excess flour was removed. The coated pieces were returned for an additional coating of both batter and flour, and were then fried for 30 seconds in a continuous fryer set at 370° F. The test also consisted of applying to non-control strips one additional batter dip using the inventive batter containing the acetylated and cross linked starch and lecithin. These pieces were also fried for 30 seconds at 370° F. in a continuous fryer. All cubes were frozen at −40° F. prior to reconstitution. Re-constitution consisted of frying 1 pound of the frozen cubes at 350° F. for 3 minutes, and holding them under a heat lamp for sensory evaluation over time.

TABLE VII

| Product | Hold Time | Sensory Score |
|---|---|---|
| Control | 5 Minutes | 7 |
| | 10 Minutes | 4 |
| | 15 Minutes | 4 |
| | 20 Minutes | 3 |
| | 30 Minutes | 3 |

TABLE VII-continued

| Product | Hold Time | Sensory Score |
|---|---|---|
| Enhanced Crispness batter | 5 Minutes | 10 |
| | 10 Minutes | 8 |
| | 15 Minutes | 8 |
| | 20 Minutes | 7 |
| | 30 Minutes | 7 |

EXAMPLE 7

Onion Rings

Onion rings are a popular coated item, which generally have an adequate holding time. This product is generally, under the prior art, coated with a flour based coating but not with a bread crumb. For this series of experiments, Spanish Onions were sliced into onion rings, with a ⅜ in. thickness, and passed three times through a Stein MB 3 Mini batter/breading system. The batter consisted of a hard red winter wheat (1 part flour to 1.2 parts water) and the coating was hard red winter wheat flour. The test product was coated similarly, but with an additional batter coating using the inventive batter containing acetylated and cross linked starch and lecithin. Both control and test rings were fried at 375° F. for 40 seconds in a continuous fryer. The rings were then frozen at −40° F. For reconstitution, a 1 pound sample of the onion rings was fried at 350° F. for 2 minutes 30 seconds and placed into a holding station for sensory evaluation over time. The results of the tests are shown in Table VIII:

TABLE VIII

| Product | Hold Time | Sensory Score |
|---|---|---|
| Control | 5 Minutes | 5 (Tough) |
| | 10 Minutes | 4 (Tough) |
| | 15 Minutes | 2 (Tough) |
| | 20 Minutes | 2 (Tough) |
| | 30 Minutes | 1 (Tough) |
| Enhanced Crispness batter | 5 Minutes | 10 |
| | 10 Minutes | 9 |
| | 15 Minutes | 8 |
| | 20 Minutes | 8 |
| | 30 Minutes | 7 (Slightly Tough) |

The control batter was tough from the initial fry, whereas the rings coated with the enhanced crispness batter exhibited toughness only after a period of 30 minutes holding.

The inventive, enhanced crispness batter containing an acetylated and cross linked starch in combination with lecithin has been proven effective in increasing the hold time and crispness of a large number of different illustrative product substrates, e.g. covering protein, vegetable, and dairy products.

For the experiments 4 through 7, a preferred formulation of the inventive enhanced crispness batter was used which contained the following ingredients:

| | |
|---|---|
| Acetylated and Cross Linked Starch | 50.9014% |
| Rice Flour | 19.30% |
| Corn Dextrin | 10.00% |
| .43 ash pastry Flour | 10.00% |
| Salt | 6.500% |
| Calcium Lactate | 0.6000% |

-continued

| | |
|---|---|
| Sodium Acid Pyrophosphate | 0.5347% |
| Corn Starch | 0.5941% |
| Sodium bicarbonate #2 | 0.4455% |
| Lecigran 5750 | 0.4000% |
| Dextrose | 0.2000% |
| Xanthan Gum 80 Mesh | 0.300% |
| Monocalcium Phosphate Monohydrate | 0.0743% |
| Vegetone Color Blend | 0.1500% |

The batter as described in the applicants' parent patent application Ser. No. 10/209,057 has additional uses in enhancing crispness and extending hold time of coated and batter/breaded items. The above-described experiments were performed to show additional applications for this batter system, i.e. such were designed so as to be broadly illustrative of the potential applications of the inventive batter to diverse and different foods and food forms and, as such, one skilled in the art recognizes that such are not limiting as to the potential uses of the inventive batter. Other protein, vegetable and dairy products such as fish, zucchini, sweet potatoes, etc. can reasonably be predicted from these experiments to benefit from this inventive batter technology.

The subject batter may be applied directly to the surface of the product to be coated, or as part of a multiple coating system. Food products which are extremely high in moisture require pre-drying and, as they experience so much shrinkage of their substrate in frying and freezing systems, their batters will typically experience excessive crumb generation. An alternate method of application on high moisture systems so as to reduce this problem is to use a multi pass dust/batter/breading system where the inventive, high hold time formulation batter is the final coating, or an intermediate coating.

While the present invention has been described by reference to specific embodiments, it will be apparent to those skilled in the art that other alternative embodiments or modifications may be employed without departing from the scope of this invention.

What is claimed is:

1. A dry batter for use in preparing a batter slurry for coating food pieces, other than potato pieces, prior to par-frying of the food pieces, which dry batter comprises:

97.4 to 99.8% by weight of a batter base selected from the group consisting of a modified food starch batter base and a flour batter base, wherein said batter base comprises a modified food starch of from 30 to 50% by weight of the dry batter, and wherein said modified food starch is acetylated or cross-linked, or acetylated and cross-linked;

0.0 to 1.0% by weight of calcium lactate; and 0.1 to 1.6% by weight of de-oiled lecithin.

2. The dry batter, as defined in claim 1, wherein the dry batter comprises from 0.1 to 1.0% by weight of calcium lactate.

3. The dry batter, as defined in claim 2, wherein the modified food starch is a modified potato starch.

4. The dry batter, as defined in claim 2, wherein the dry batter comprises, as a percent-by-weight of the dry batter, the following:

| | |
|---|---|
| modified food starch: | 40-50% |
| rice flour: | 10-45% |
| dextrin: | 5-30% |
| salt: | 0-10% |

-continued

| | |
|---|---|
| de-oiled lecithin: | 0.1-1.6% |
| calcium lactate: | 0.1-1.0% |
| leavening: | 0-5% |
| xanthan gum: | 0-0.50%. |

5. The dry batter, as defined in claim 2, wherein the dry batter comprises, in percent-by-weight of the dry batter, the following:

| | |
|---|---|
| wheat flour | 10-60% |
| modified food starch | 30-50% |
| rice flour | 10-45% |
| dextrin | 5-30% |
| salt | 0-10% |
| de-oiled lecithin | 0.1-1.6% |
| calcium lactate | 0.1-1.0% |
| leavening | 0-5% |
| xanthan gum | 0-0.50%. |

6. The dry batter as defined in claim 1, wherein the dry batter is for use in preparing a batter slurry for coating meat, poultry, fish, vegetable or dairy food products.

7. The dry batter as defined in claim 1, wherein the dry batter is for use in preparing a batter slurry for coating chicken, cheese, mushroom, onion rings, fish, zucchini, or sweet potato food products.

8. A batter slurry for coating food pieces, other than potato pieces, prior to par-frying of the food pieces, said batter slurry comprising a mixture of dry batter in water, said dry batter comprising, as a percentage by weight of said dry batter:
   97.4 to 99.8% by weight of a batter base selected from the group consisting of a modified food starch batter base and a flour batter base, wherein said batter base comprises a modified food starch of from 30 to 50% by weight of the dry batter, and wherein said modified food starch is acetylated or cross-linked, or acetylated and cross-linked;
   0.0 to 1.0% by weight of calcium lactate; and
   0.1 to 1.6% by weight of de-oiled lecithin.

9. The batter slurry, as defined in claim 8, wherein said calcium lactate is from 0.1 to 1.0% by weight of said dry batter.

10. The batter slurry, as defined in claim 9, wherein the modified food starch is a modified potato starch.

11. The batter slurry, as defined in claim 8, wherein said dry batter comprises, as a percent-by-weight of the dry batter, the following:

| | |
|---|---|
| modified food starch: | 40-50% |
| rice flour: | 10-45% |
| dextrin: | 5-30% |
| salt: | 0-10% |
| de-oiled lecithin: | 0.1-1.6% |
| calcium lactate: | 0.1-1.0% |
| leavening: | 0-5% |
| xanthan gum: | 0-0.50%. |

12. The batter slurry, as defined in claim 8, wherein said dry batter comprises, as a percent-by-weight of the dry batter, the following:

| | |
|---|---|
| wheat flour | 10-60% |
| modified food starch | 30-50% |
| rice flour | 10-45% |
| dextrin | 5-30% |
| salt | 0-10% |
| de-oiled lecithin | 0.1-1.6% |
| calcium lactate | 0.1-1.0% |
| leavening | 0-5% |
| xanthan gum | 0-0.50%. |

13. The batter slurry, as defined in claim 8, wherein said batter slurry has a solids content of about 20-60% by weight and a viscosity in the range of about 200-2000 centipoise when measured on a Brookfield DVII Viscometer at 20 rpm.

14. The batter slurry, as defined in claim 13, wherein the solids content is about 30-50% by weight and the viscosity is in the range of about 300-1800 centipoise.

15. The batter slurry as defined in claim 8, wherein the batter slurry is for coating meat, poultry, fish, vegetable or dairy food products.

16. The batter slurry as defined in claim 8, wherein the batter slurry is for coating chicken, cheese, mushroom, onion rings, fish, zucchini, or sweet potato food products.

* * * * *